United States Patent [19]

Musschoot

[11] Patent Number: 5,713,457
[45] Date of Patent: Feb. 3, 1998

[54] TWO-WAY VIBRATORY FEEDER OR CONVEYOR

[75] Inventor: Albert Musschoot, Barrington, Ill.

[73] Assignee: General Kinematics Corporation, Barrington, Ill.

[21] Appl. No.: 568,018

[22] Filed: Dec. 6, 1995

[51] Int. Cl.$^6$ .................................................. B65G 27/32
[52] U.S. Cl. .......................................... 198/753; 198/760
[58] Field of Search .............................. 198/752.1, 753, 198/759, 760, 763

[56] References Cited

U.S. PATENT DOCUMENTS

| | | | |
|---|---|---|---|
| 2,993,585 | 7/1961 | Musschoot | 198/760 |
| 3,746,149 | 7/1973 | Schrader | 198/753 |
| 3,834,523 | 9/1974 | Evans | 198/763 |
| 3,892,308 | 7/1975 | Schrader | 198/753 |
| 4,149,627 | 4/1979 | Dumbaugh et al. | 198/770 |
| 5,407,060 | 4/1995 | Kreft | 198/763 |
| 5,547,068 | 8/1996 | Spurlin | 198/760 |

*Primary Examiner*—James R. Bidwell
*Attorney, Agent, or Firm*—Wood, Phillips, VanSanten, Clark & Mortimer

[57] ABSTRACT

Bearing failure and noise generation problems of prior art, vibratory feeders are eliminated in a construction including a bed (10) having an elongated, generally horizontal feeding or conveying surface (56) having opposed ends (52) and (54). Spaced resilient isolation elements (58) mount the bed (50) above the underlying terrain (68) and a rotatable shaft (74) with an eccentrically mounted weight (56) is journalled to the bed (50) for bi-directional rotation about a generally horizontal axis. A pair of dynamic balancers (82), (84) are connected to the bed, one on each side of the shaft (74) and serve to reduce the vertical component of vibration imparted to the surface (56).

13 Claims, 3 Drawing Sheets

TWO-WAY VIBRATORY FEEDER OR CONVEYOR

FIELD OF THE INVENTION

This invention relates to vibratory feeders or conveyors of the two-way or reversible type that may be employed to feed or convey objects in either of two directions.

BACKGROUND OF THE INVENTION

Two-way vibratory feeders or conveyors have substantial applications in a variety of fields. One typical application is in foundry operations. For example, castings may be delivered to the feeder or conveyor at a location intermediate its ends and then the feeder or conveyor energized to feed the castings to one end or the other depending upon where it is desired to locate the casting.

A typical two way feeder or conveyor made according to the prior art is shown in FIG. 1 and is seen to include an elongated bed, generally designated 10. The bed includes an elongated, upwardly facing, generally horizontal conveying or feeding surface, 12 terminating at opposite ends 14 and 16.

The bed 10 is supported on isolation springs 18, 20 adjacent the ends 14 and 16 respectively. The isolation springs 18, 20 are shown mounted on the upper ends of pedestals 22 which in turn serve to mount the bed 10 above the underlying terrain, shown as a floor 24 in a factory building or the like.

Two motor and weight assemblies forming vibration inducing systems, generally designated 26 and 28 are secured to the bed 10 generally centrally thereof. Each includes a squirrel cage motor 30 having a rotary output shaft 32 to which is secured an eccentrically mounted weight 34. Springs, in the form of plastic or fiberglass slats 36, connect each of the motors 30 to the bed 10.

It will be seen that the system 26 is canted at approximately 45° toward the left while the assembly 28 is canted approximately 45° toward the right.

In operation, if the system 26 is energized, vibration resulting from eccentric revolution of the weight 34 associated therewith will cause flow along the surface 12 from right to left as viewed in FIG. 1. When it is desired to convey or feed in the opposite direction, the system 26 is deenergized and the system 28 energized.

In many applications, it is not unusual that there will be a considerable disparity between the amount of use of the systems 26 and 28. For example, if the system 26 is energized to the substantial exclusion of the system 28 for a period of time, so-called "False Brinnelling" of the motor bearings in the motor 30 associated with the system 28 will occur as a result of the vibration imparted to the bed 10 to which the system 28 is also attached. Lubricant may be squeezed out of the bearings as a result and as a consequence, when the system 28 is finally energized, it may fail relatively quickly as a result of bearing failure due to false Brinnelling and the resulting insufficient lubrication of the bearings.

Moreover, in foundry applications, it will be necessary that the bed 10 be formed of metal to stand up to the continued pounding of castings. In a prior art system such as shown in FIG. 1, vertical acceleration of the conveying or feeding surface 12 during operation will typically exceed that of gravity. As a result, after the surface 12 has reached its highest point of movement in a cycle of vibration, it will then be accelerated downwardly more rapidly than a casting or the like on the surface 12. The casting will be temporarily suspended above the surface 12, but will eventually collide with the same as movement of the surface 12 begins to reverse while the casting is being moved downwardly under the influence of gravity. The result is a noise producing impact of the casting upon the metal of which the surface 12 is formed, the level of which will typically be undesirably high.

Finally, it will also be appreciated that the provision of two vibration producing systems 26 and 28 when only one is used at any given time adds considerably to the cost of the apparatus.

The present invention is directed to overcoming one or more of the above problems.

SUMMARY OF THE INVENTION

It is the principal object of the invention to provide a new and improved two-way or reversible, vibratory feeder or conveyor. More specifically, it is an object of the invention to provide such a feeder or conveyor wherein the problem of premature bearing failure is eliminated; the noise produced during operation is substantially reduced; and the cost of construction is reduced by the elimination of expensive components.

An exemplary embodiment of the invention achieves the foregoing objects in a feeder or conveyor including a bed with an elongated, generally horizontal feeding or conveying surface having opposed ends. Spaced resilient isolation elements are provided for mounting the bed above the underlying terrain and a rotatable shaft with an eccentrically mounted weight is mounted to the bed and journalled thereon for bi-directional rotation about a generally horizontal axis that is non-parallel to the direction of elongation of the bed. A pair of dynamic balancers are connected to the bed, one on each side of the shaft.

As a result of this construction, the direction of feeding or conveying can be reversed simply by changing the direction of rotation of the shaft. And since the shaft is rotating regardless of the direction of feed, there is no opportunity for false Brinnelling and loss of lubrication to occur at bearings which are quiescent.

Importantly, the invention eliminates one of the motor and weight systems of the prior art thereby effecting a substantial cost savings. And quite unexpectedly, it has been found that the vertical acceleration of the conveying or feeding surface is reduced to the point that it is substantially at or less than the gravitational acceleration with the consequence that during operation, contact between the surface and castings or the like being fed or conveyed thereon is maintained throughout each cycle so that noise imparting collisions between the castings and the conveying surface, and the noise produced thereby, is substantially reduced.

In a preferred embodiment, a reversible motor is provided for driving the shaft at a selected operational frequency. Each of the dynamic balancers has a natural frequency that is just greater than the operational frequency of the reversible motor.

Preferably, the motor includes a rotary output shaft which comprises the rotatable shaft on which the weight or weights are mounted.

In one embodiment of the invention, each dynamic balancer includes at least one spring having one end connected to the bed and another end mounting a weight.

In a preferred embodiment, there is provided a reversible vibratory feeder or conveyor that includes a bed having a generally horizontal, elongated feeding or conveying surface. Spaced, resilient isolation elements are connected to the bed for mounting the bed above the underlying terrain. A rotatable shaft is located intermediate the ends of the feeding or conveying surfaces and mounts an eccentric weight. The shaft is journalled on the bed and means are provided for selectively rotating the shaft in either direction at a selected operational frequency. Two spring and weight systems, each including at least one spring with a weight mounted on one end of the spring and with the opposite end of the spring connected to the bed, are provided. One spring and weight system is connected to the bed between one of the bed ends and the shaft and the other spring and weight system is connected to the bed between the other end of the bed and the shaft. The connection is such that the respective weights are free of constraint other than their respective connections to the springs. The natural frequency of each spring and weight system is just greater than the operational frequency.

According to this embodiment of the invention, the conveyor or feeder has a center of gravity and the rotational axis of the shaft is located in close proximity to such center of gravity.

Preferably, the isolation elements are isolation springs. The feeder or conveyor and the isolation springs have a natural frequency less than half of the operational frequency.

In a highly preferred embodiment of the invention, a vibratory two-way feeder or conveyor is provided and includes an elongated bed having an upwardly facing, generally horizontal feeding or conveying surface with opposed ends. A reversible motor having an output shaft is mounted on the bed generally centrally thereof with the shaft transverse to the direction of elongation of the bed. The motor is operable at an intended operational frequency.

An eccentric weight is mounted on and is rotatable with the shaft at the operational frequency.

Spaced isolation springs are secured to the bed near the ends thereof and are adapted to mount the bed above the underlying terrain. The isolation springs and the feeder or conveyor have a natural frequency less than half of the operational frequency.

Dynamic balancers, one near each end of the bed, are provided. Each dynamic balancer includes a weight with at least one dynamic balancer spring secured thereto. The dynamic balancer spring also is secured to the bed such that the associated weight is freely movable with respect to the bed except as constrained by the associated dynamic balancer spring. Each dynamic balancer has a natural frequency just greater than the operational frequency.

Preferably, each dynamic balancer includes two spaced coil springs defining the dynamic balancer spring and the coil springs are in side by side relation with the weights extending between corresponding ends of the associated coil spring.

In a highly preferred embodiment, there are two isolation springs near each end of the bed and each dynamic balancer is located between the isolation springs at the corresponding end of the bed.

Other objects and advantages will become apparent from the following specification taken in connection with the accompanying drawings.

DESCRIPTION OF THE PREFERRED EMBODIMENT

Figure 2:
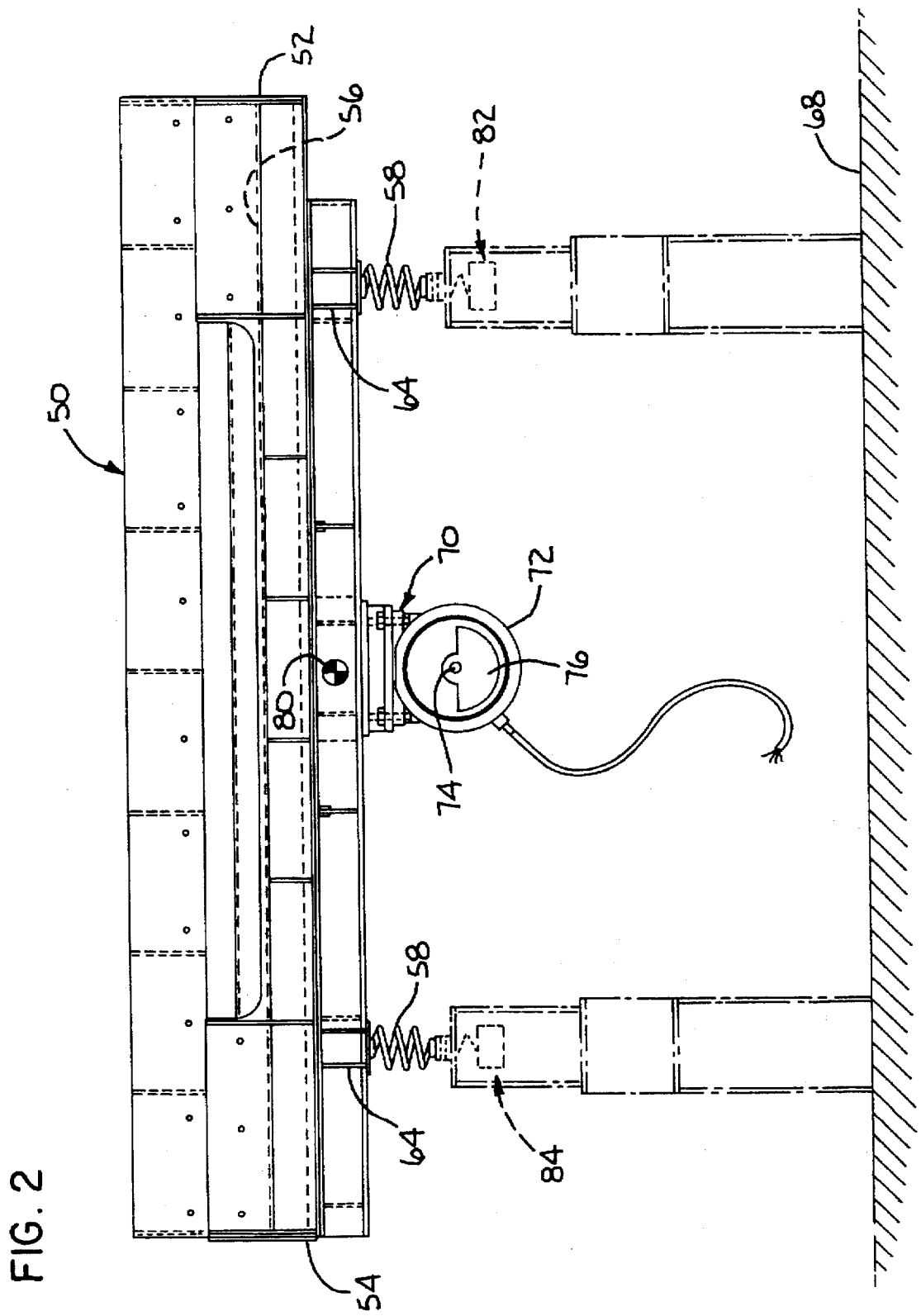
FIG. 2 is a view similar to FIG. 1 but of a two-way vibratory feeder or conveyor made according to the inventor.
Figure 3:
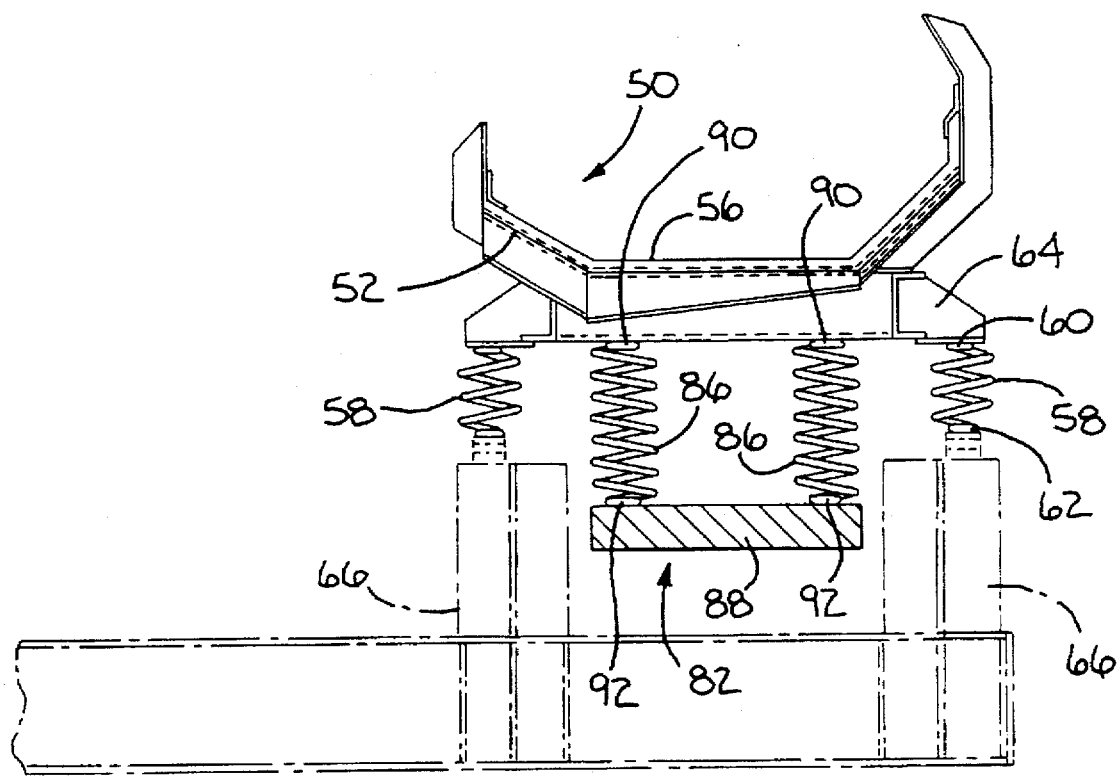
FIG. 3 is a side elevation of the vibratory feeder or conveyor of the invention taken from the right hand side of FIG. 2.

An exemplary embodiment of a feeder or a conveyor made according to the invention is illustrated in FIGS. 2 and 3 and with reference thereto is seen to comprise an elongated bed, generally designated 50, having opposed ends 52 and 54. As best seen in FIG. 3, the bed 50 includes an upwardly facing, generally horizontal feeding or conveying surface 56 which typically will be formed of steel plate or the like.

Near each of the ends 52 and 54, isolation springs 58 are located. As seen in FIG. 2, the springs 58 near adjacent ends 52 and 54 are spaced from one another and as seen in FIG. 3, at each of the ends 52 and 54, there are located two spaced isolation springs 58.

The isolation springs 58 are shown as metallic coil springs. However, those skilled in the art will readily appreciate that in many instances, that elastomeric or pneumatic spring systems may be employed as the isolation springs 58.

In the case of the coil springs illustrated, each spring 58 has opposed ends 60 and 62, typically of reduced diameter for receiving a bolt or the like. The ends 60 of each compression coil spring are secured to a cross brace 64 forming part of the bed 50 as well as to an underlying pedestal 66 which in turn is mounted on the underlying terrain such as a factory floor 68 (FIG. 2).

Generally centrally of the bed 50 is a vibration producing system, generally designated 70. In the usual case, the system 70 will include a squirrel cage motor 72 having a rotary output shaft 74 on which a weight 76 is eccentrically mounted. The squirrel cage motor 72 will be a reversible motor and preferably, will be such that the axis of rotation of the shaft 74 is in a vertical plane encompassing the center of gravity 80 of the feeder or conveyor. It is also desirable, but not necessary, that the rotational axis of the shaft 74 be as close to the center of gravity 80 as possible for reasons to be seen.

The system is completed by the provision of two dynamic balancers, one generally designated 82 and located near the end 52 and the other generally designated 84 and located near the end 54. The dynamic balancers 82 and 84 are identical to each other and only the dynamic balancer 82 will be described. It is shown in FIG. 3 and includes a weight and spring system made up of two coil springs 86 and an interconnecting weight 88. One end 90 of each of the coil springs 86 is connected to the cross brace 64 in spaced relation to each other and between the isolation coil springs 58. The opposite ends 92 of each of the springs 86 are connected to the weight 88 which extends between corresponding ends of the springs 86 as shown in FIG. 3.

While FIG. 3 illustrates the weights 88 as being suspended by the springs and in depending relation to the surface 56, the weights 88 of each dynamic balancer 82 and 84 could be above the corresponding spring and even above the surface 56 if desired.

The dynamic balancers 82 and 84 serve to dampen or eliminate much of the vertical component of the vibration imparted to the surface 56. Those skilled in the art will readily recognize that without the dynamic balancers 82 and 84, if the motor 72 were energized to rotate the weight 76, any given point on the bed 50 would move in a circular path. However, because of the presence of the dynamic balancers 82 and 84, any such point will now move in the path of an ellipse whose major axis is horizontal because of the vertical orientation of the springs 86. That is to say, the dynamic balancers 82 and 84 dampen out much of the vertical vibratory force that would otherwise be applied to the surface 56 from the vibration inducing system 70.

For best results, it is desired that certain interrelationships between system components be applied. In one example, the squirrel cage motor 72 will rotate at, for example, 1185–1190 RPM (based on a motor whose synchronous speed would be 1200 RPM). This then sets an operational frequency for the vibration imparting system 70 of 1185–1190 cycles per minute.

Because the conveyor is mounted on the underlying terrain via the isolation springs 58, it will be appreciated that it will have a natural vibration frequency. This frequency will be determined by the spring constants of the springs 58 as well as the mass of all conveyor components supported thereby. Desirably, the natural frequency of the isolation springs 58 and the conveyor will be less than half the operational frequency and in a preferred embodiment, would be about ⅓ of the operational frequency or about 400 CPM.

More importantly is the natural frequency of each of the dynamic balancers 82 and 84. It is preferred that they be just greater than the operational frequency of the system. Thus, for a system whose operational frequency is in the range of 1185–1190 CPM, a natural frequency of 1200 CPM for each of the systems 82 and 84 would be desirable.

The natural frequency of a spring and weight system is represented by the formula:

$$f = \frac{60}{2\pi} \left( \frac{kg}{w} \right)^{1/2}$$

where f is the natural frequency in cycles per minute k is the spring rate in pounds per inch g is the force of gravity (386 inches per second per second)

w is mass in pounds

Knowing the operational frequency of the system, which is determined by the characteristics of the motor used, and gravitational acceleration and the spring rate of the springs to be employed as the dynamic balancer springs 86, it is only necessary to solve the equation for w to determine the mass of each weight 88 to be used in a given system.

As noted previously, by maintaining the rotational axis of the shaft 74 of the motor 72 as close to the center of gravity 80 as possible, it is easier to tune the system to obtain optimum operation by adding or subtracting mass from the weight 88 in each of the dynamic balancers 82 and 84.

If conveying rates are to be changeable, then systems known in the art whereby the amount of unbalanced weight on the shaft 74 can be changed may be employed. To some degree, conveying rate can be altered by changing the output speed of the motor 72 as well.

Figure 1:
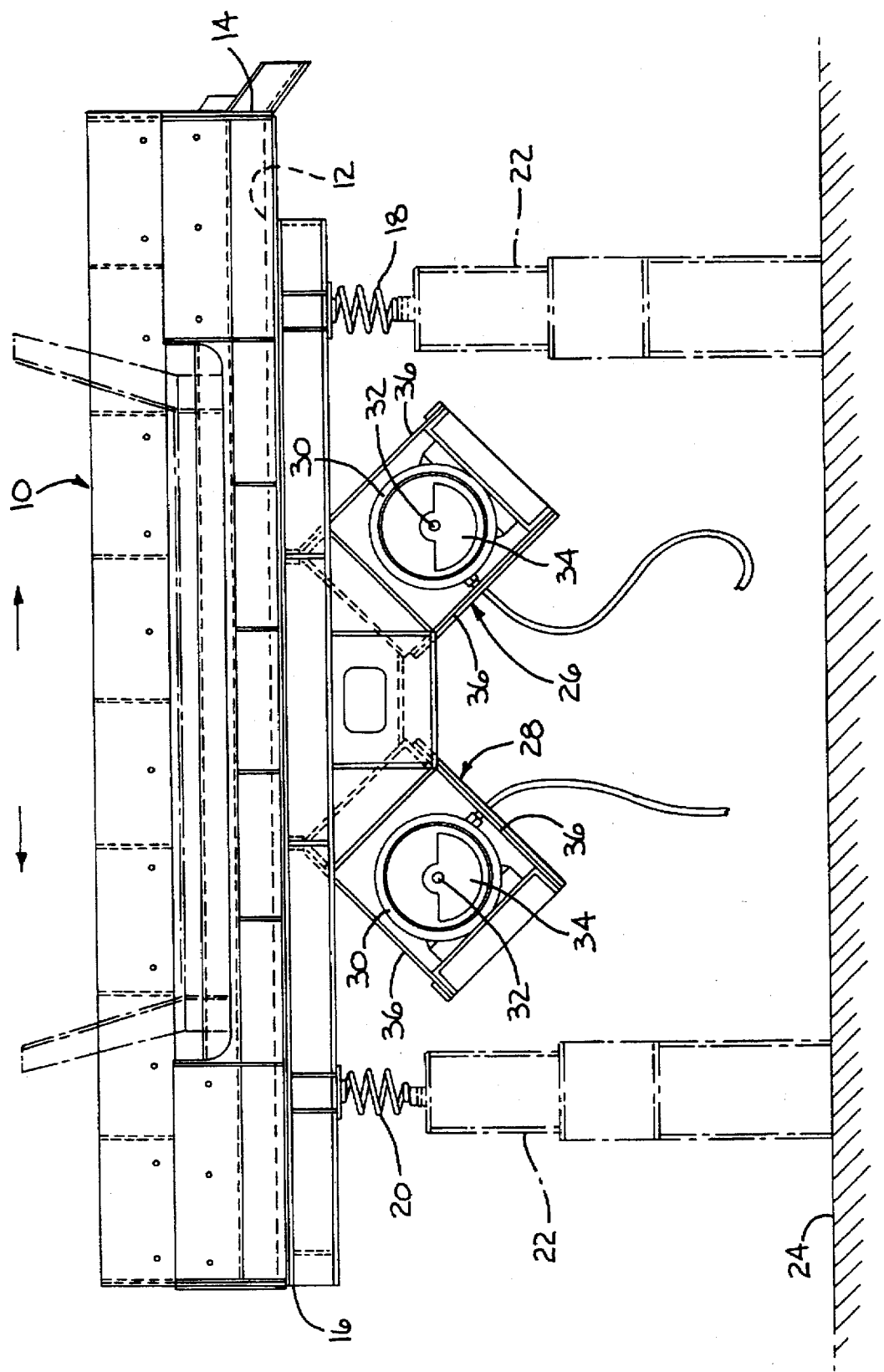
FIG. 1 is a side elevation of a two-way vibratory feeder or conveyor made according to the prior art.

The conveyor or feeder of the invention possesses significant advantages over the prior art apparatus as shown in FIG. 1. For example, it eliminates entirely one of the motors required by the prior art system while retaining its function. In a typical installation, a cost savings of $3,500 may be achieved.

And because the second motor, which in the prior art device is quiescent when the first motor is operational, is eliminated, there is no quiescent rotary device in the system whose bearings are subject to false Brinnelling and loss of lubrication. Thus, a source of apparatus failure found in the prior art device is eliminated as well.

It has been found that a feeder or conveyor made according to the invention and having the characteristics identified previously can convey at speeds up to 30 feet per minute, which is almost twice as fast as the conventional feeder or conveyor shown in FIG. 1.

And most surprisingly, because so much of the vertical component of the vibration imparted to the bed 50 is eliminated through the action of the dynamic balancers 82 and 84, the surface 56 is not accelerated vertically at a rate in excess of the acceleration rate of gravity. As a consequence, recurring collisions between the surface 56 and material conveyed thereon are eliminated with the result that a substantial noise reduction in the environment of the operation of the feeder or conveyor is achieved. This same factor also allows a feeder or conveyor made according to the invention to be used more flexibly. Prior art devices such as that shown in FIG. 1 are incapable of conveying powders. Their vertical acceleration rate of their conveying surfaces 12 is such that any powder placed thereon tends to fluff up and act like a fluidized bed on the conveying surface. When that occurs, the powder is incapable of being conveyed.

However, because, in a feeder or conveyor made according to the invention, contact between the material being conveyed and the conveying surface 56 is not lost as a result of accelerational forces, the feeder or conveyor of the invention is quite capable of conveying powdered materials, thereby extending its usefulness to new applications wherein the prior art feeder or conveyor of FIG. 1 simply would not work. In this case, the invention may find substantial utility as an unidirectional vibratory conveyor for particulate material of the type mentioned above.

I claim:

1. A feeder or conveyor, comprising:
    a bed including an elongated, generally horizontal feeding or conveying surface having opposed ends;
    spaced resilient isolation elements for mounting said bed above the underlying terrain;
    a rotatable shaft, with an eccentrically mounted weight mounted to said bed and journalled thereon for bi-directional rotation about a generally horizontal axis that is nonparallel to the direction of elongation of said bed; and
    a pair of dynamic balancers connected to said bed, one on each side of said shaft, said dynamic balancers serving to dampen to eliminate the vertical component of vibration applied to said surface as a result of rotation of said shaft and said eccentrically mounted weight in either direction.

2. The feeder or conveyor of claim 1 further including a reversible motor for driving said shaft at a selected operational frequency, and wherein each of said dynamic balancers has a natural frequency that is greater than said operational frequency.

3. The feeder or conveyor of claim 2 wherein said motor includes a rotary output shaft comprising said rotatable shaft.

4. The feeder or conveyor of claim 1 wherein each said dynamic balancer includes a generally vertically acting spring having one end connected to said bed and another end mounting a weight.

5. A vibratory feeder or conveyor, comprising:
    a bed having a generally horizontal, elongated feeding or conveying surface having opposite ends;

spaced, resilient isolation elements connected to said bed for mounting the bed above the underlying terrain;

a rotatable shaft located intermediate said ends and mounting an eccentric weight, said shafted being journalled on said bed;

means for selectively rotating said shaft in either direction at a selected operational frequency;

and two spring and weight systems each including at least one spring with a weight mounted on one end of the spring and with the opposite end of the spring connected to the bed, one spring and weight system being connected to the bed between one bed end and said shaft and the other spring and weight system being connected to the bed between the other bed end and said shaft with their respective weights essentially free of constraints other than the respective connection to the springs, the natural frequency of each said spring and weight system being greater than said operational frequency.

6. The vibratory feeder or conveyor of claim 5 wherein said conveyor or feeder has a center of gravity and the rotation axis of said shaft is located in close proximity to said center of gravity.

7. The vibratory feeder or conveyor of claim 5 wherein said isolation elements are isolation springs, said feeder or conveyor and said isolation springs having a natural frequency less than half said operational frequency.

8. A vibratory feeder or conveyor, comprising:

an elongated bed having an upwardly facing, generally horizontal feeding or conveying surface with opposed ends;

a reversible motor having an output shaft and mounted on said bed generally centrally thereof with said shaft generally transverse to the direction of elongation of said bed, said motor operable at an operational frequency;

an eccentric weight mounted on and rotatable with said shaft at said operational frequency;

spaced isolation springs secured to said bed near the ends thereof and adapted to mount the bed above the underlying terrain, said isolation springs and said feeder and conveyor having a natural frequency less than half said operational frequency; and dynamic balancers, one near each of said bed ends, each dynamic balancer including a weight with at least one dynamic balancer spring secured thereto, each dynamic balancer spring also being secured to the bed with the associated weight freely movable vertically with respect to the bed except as constrained by the associated dynamic balancer spring, each dynamic balancer having a natural frequency greater than said operational frequency.

9. The vibratory feeder or conveyor of claim 8 wherein each dynamic balancer includes two spaced coil springs defining said at least one dynamic balancer spring, said coil springs being in side by side relation and said weights extending between corresponding ends of the associated coil springs.

10. The vibratory feeder or conveyor of claim 9 wherein there are two said isolation springs near each end of said bed and each said dynamic balancer is located between the isolation springs at the corresponding end of said bed.

11. The vibratory feeder or conveyor of claim 8 wherein there are two said isolation springs near each end of said bed and each said dynamic balancer is located between the isolation springs at the corresponding end of said bed.

12. The vibratory feeder or conveyor of claim 8 wherein each said dynamic balancer natural frequency is just greater than said operational frequency.

13. A method of operating a vibratory feeder or conveyor of the type having a generally horizontal elongated bed defining a feeding or conveying surface, spaced resilient isolation elements mounting the bed above the underlying terrain; a rotatable shaft paralleled on the bed for rotation about a generally horizontal axis that is nonparallel to the elongation of the bed, an eccentric weight carried by the shaft and a pair of dynamic balancers connected to the bed, one on each side of the shaft, for damping or eliminating the vertical component of a vibratory force imparted to the surface, the steps of:

a) providing a reversible motor with a rotatable output and connecting it to the shaft to rotate the shaft;

b) causing the motor to rotate its output in one rotational direction to feed or convey on said surface in one direction; and c) causing the motor to rotate its output in a rotational direction opposite said one rotational direction to feed or convey on said surface in a direction opposite said one direction.

* * * * *